(12) United States Patent  (10) Patent No.: US 12,145,148 B2
Yli-Alho et al.  (45) Date of Patent: Nov. 19, 2024

(54) FLUID ANALYSER AND METHOD

(71) Applicant: AEROMON OY, Helsinki (FI)

(72) Inventors: Jani Yli-Alho, Helsinki (FI); Jussi Tikkanen, Helsinki (FI); Matti Irjala, Helsinki (FI)

(73) Assignee: AEROMON OY, Helsinki (FI)

( * ) Notice: Subject to any disclaimer, the term of this patent is extended or adjusted under 35 U.S.C. 154(b) by 931 days.

(21) Appl. No.: 17/253,717

(22) PCT Filed: Jun. 19, 2019

(86) PCT No.: PCT/FI2019/050471
§ 371 (c)(1),
(2) Date: Dec. 18, 2020

(87) PCT Pub. No.: WO2019/243667
PCT Pub. Date: Dec. 26, 2019

(65) Prior Publication Data
US 2021/0260581 A1 Aug. 26, 2021

(30) Foreign Application Priority Data
Jun. 20, 2018 (FI) .................................. 20185560

(51) Int. Cl.
B01L 3/00 (2006.01)
(52) U.S. Cl.
CPC ... *B01L 3/502715* (2013.01); *B01L 2200/027* (2013.01); *B01L 2200/028* (2013.01);
(Continued)

(58) Field of Classification Search
CPC ......... B01L 3/502715; B01L 2200/027; B01L 2200/028; B01L 2300/0663; B01L 2300/0809; B01L 2300/087; G01N 35/10
See application file for complete search history.

(56) References Cited

U.S. PATENT DOCUMENTS 6,123,820 A   9/2000 Bergkuist et al.
2002/0124896 A1* 9/2002 O'Connor ............. B01F 25/432
                                                     137/833
(Continued)

FOREIGN PATENT DOCUMENTS

CN   106215987 B  *  9/2018  ............ B01L 3/5027
DE   102009042679 A1    3/2011
(Continued)

OTHER PUBLICATIONS

Finnish Search Report issued by the Finnish Patent and Registration Office in relation to Finnish Application No. 20185560 dated Nov. 22, 2018 (2 pages).
(Continued)

*Primary Examiner* — Dennis White
(74) *Attorney, Agent, or Firm* — Robert P. Michal, Esq.; Carter, DeLuca & Farrell LLP

(57) ABSTRACT

A fluid analyser includes an analyser casing having a casing wall or walls, at least one fluid sensor for analysing fluid, a fluid inlet arrangement for supplying fluid into the fluid analyser, and one or more fluid conduits for conducting fluid between the fluid inlet arrangement and one or more of the at least one fluid sensors. The fluid analyser further includes at least part of the one or more fluid conduits being provided inside the casing wall or walls.

17 Claims, 7 Drawing Sheets

(52) U.S. Cl.
CPC .................. *B01L 2300/0663* (2013.01); *B01L 2300/0809* (2013.01)

(56) References Cited

U.S. PATENT DOCUMENTS

| | | |
|---|---|---|
| 2009/0272205 A1 | 11/2009 | Brown et al. |
| 2009/0308136 A1 | 12/2009 | Wang et al. |
| 2010/0075425 A1 | 3/2010 | Hofmann et al. |
| 2011/0309841 A1 | 12/2011 | Oberndorfer et al. |
| 2018/0328007 A1 | 11/2018 | Ross et al. |

FOREIGN PATENT DOCUMENTS

| | | |
|---|---|---|
| EP | 0193939 A2 | 9/1986 |
| GB | 2536975 A | 10/2016 |
| WO | 2017076981 A1 | 5/2017 |

OTHER PUBLICATIONS

International Search Report issued by the Finnish Patent and Registration Office acting as the International Searching Authority in relation to International Application No. PCT/FI2019/050471 dated Oct. 9, 2019 (8 pages).

Written Opinion of the International Searching Authority issued by the Finnish Patent and Registration Office acting as the International Searching Authority in relation to International Application No. PCT/FI2019/050471 dated Oct. 9, 2019 (10 pages).

\* cited by examiner

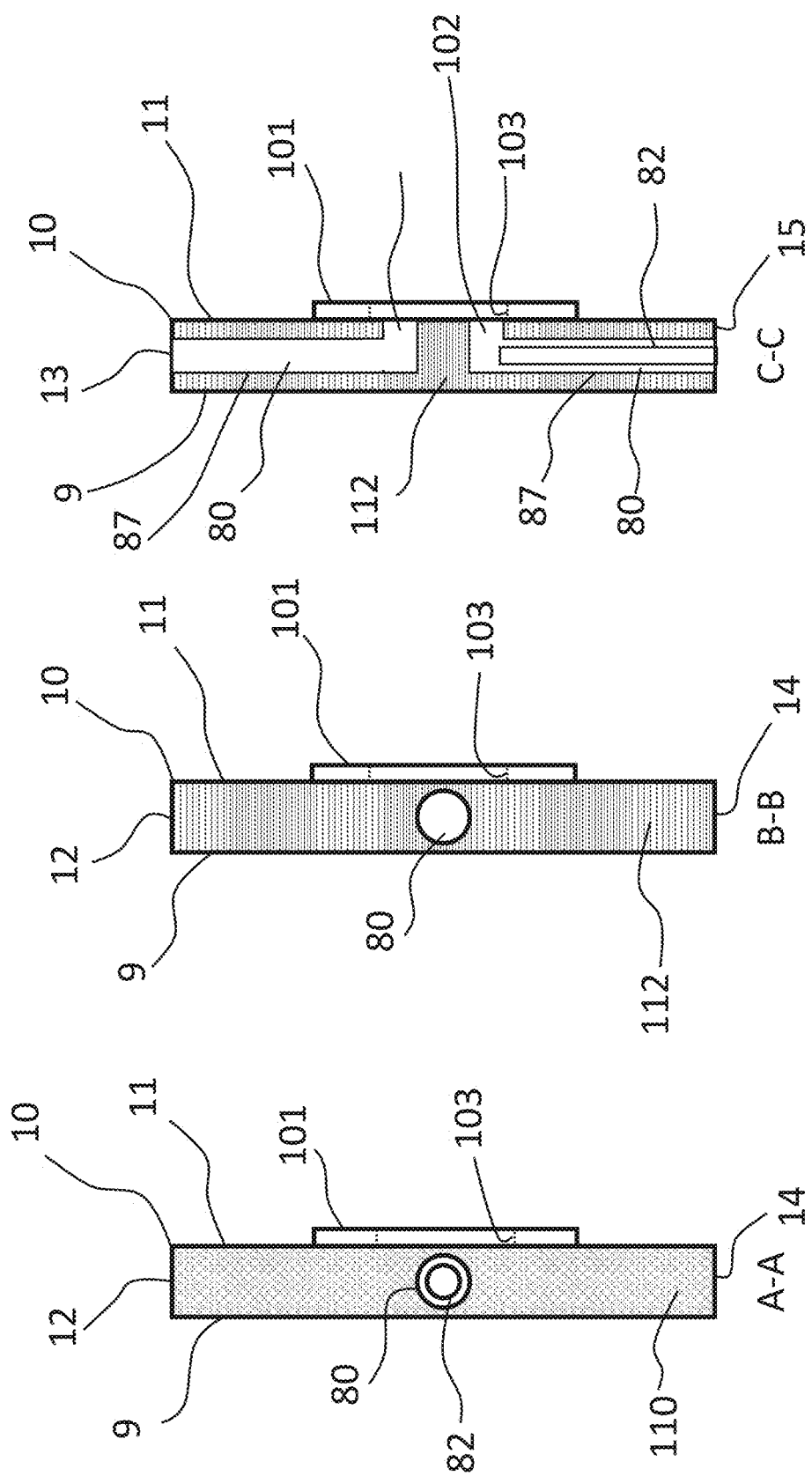

FLUID ANALYSER AND METHOD

CROSS-REFERENCE TO RELATED APPLICATIONS

This application is a national phase entry under 35 U.S.C. 371 of PCT International Application No. PCT/FI2019/050471 filed Jun. 19, 2019, which claims priority to Finnish Patent Application No. 20185560, filed Jun. 20, 2018, the disclosure of each of these applications is expressly incorporated herein by reference in their entirety.

FIELD OF THE INVENTION

The present invention relates to a fluid analyser. The present invention further relates to a method for analysing fluid in a fluid analyser.

BACKGROUND OF THE INVENTION

Fluid analysers are conventionally used for analysing different kind of fluid. In the context of this application the term fluid is considered to comprise flowing substances such as gases, aerosols, liquids, suspensions or mixtures thereof. The fluid analysers may analyse or measure different kinds of properties of the fluids such as compositions of fluids, or concentrations of different substances in the fluids, or physical properties of the fluids. Therefore, the fluid analysers usually comprise one or more sensors configured to measure one or more properties of the fluids. The sensors may comprise gas sensors, liquid sensors, particle sensors or any other known sensors capable of measuring fluid properties.

Normally, a fluid sample to be analysed or measured is led inside the analyser. Inside the analyser body or casing the fluid sample is conveyed in fluid channels or tubes. The sensors are also provided inside the analyser body or casing and the sample fluid is supplied to the sensors with the separate fluid tubes or fluid channels inside the analyser casing.

One of the disadvantages associated with the prior art is that modifying the analyser requires disassembling the whole analyser and reconnecting the fluid tubes or even changing the fluid tubes. Further, the size of the analyser casing has to be large as all the components mentioned above have fit inside the analyser casing.

BRIEF DESCRIPTION OF THE INVENTION

An object of the present invention is to provide a fluid analyser, a method and use such that the prior art disadvantages are solved or at least alleviated. The objects of the invention are achieved by the fluid analyser according to independent claim 1. The objects of the present invention are further achieved by the method according to the claim 15.

The preferred embodiments of the invention are disclosed in the dependent claims.

The invention is based on the idea of providing a fluid analyser comprising an analyser casing having casing wall or walls defining an inner casing space, one or more sensors parts having a fluid sensor for analysing sample fluid, a fluid inlet arrangement for supplying sample fluid into the fluid analyser, and one or more fluid conduits for conducting sample fluid between the fluid inlet arrangement and one or more of the at least one fluid sensor parts. According to the present invention at least part of the one or more fluid conduits are provided inside a wall structure of the casing wall or walls, and the at least one sensor part is connected to the casing wall or walls of the analyser casing and to the one or more fluid conduits provided inside the casing wall or walls for providing sample fluid into the at least one sensor part. Therefore, the sample fluid may be conducted at least part of the distance between the fluid inlet arrangement and at least one of the one or more fluid sensors or sensor parts inside the analyser wall or walls. This enables simple structure for supplying the sample fluid into the fluid sensors. Furthermore, this eliminates separate fluid conduit tubes provided inside the inner space of the analyser casing leaving more space for other components or enabling smaller analyser casing.

Thus, the fluid conduits may extend inside the casing wall or walls between the fluid inlet arrangement and the sensor parts and/or between the two or more sensor parts.

The wall structure of the casing wall or walls may comprise a first wall surface and a second wall surface. The one or more fluid conduits may be provided between the first and second wall surfaces. Thus, the fluid conduits extend inside the casing wall or walls between the first and second wall surfaces. This enables utilizing the thickness of the casing wall or walls and the fluid analyser may be provided simple in structure as number of separate parts may be decreased.

In the analyser casing, at least one of the casing wall or walls may be formed as solid wall. Thus, the casing wall or walls may be formed from one material and with uniform structure.

Alternatively, in the analyser casing, at least one of the casing wall or walls may comprise a first surface layer forming the first wall surface and a second surface layer forming the second wall surface. The at least one of the casing wall or walls may further comprise a hollow core between the first and second surface layer. The hollow core may provide suitable space for the fluid conduits inside the casing wall or walls.

Yet alternatively, in the analyser casing, at least one of the casing wall or walls may comprise a first surface layer forming the first wall surface and a second surface layer forming the second wall surface. The at least one of the casing wall or walls may comprise a honeycomb structure, cellular structure or net-structure between the first and second surface layers. The honeycomb, cellular, net-like core of the casing wall or walls provides light and strong structure. Furthermore, the honeycomb, cellular or net-like core enables providing the fluid conduits easily inside the casing wall or walls without decreasing the structural strength of the casing wall or walls.

Further alternatively, in the analyser casing, at least one of the casing wall or walls may comprise a first surface layer forming the first wall surface and a second surface layer forming the second wall surface. The at least one of the casing wall or walls may comprise foam material between the first and second surface layer. The foam core between the surface layers provides light and rigid structure, and the fluid conduits may be easily provided to the foam core.

In the analyser casing, at least one of the casing wall or walls may be made by additive manufacturing such that the one or more fluid conduits provided inside the casing wall or walls is formed by the additive manufacturing. Additive manufacturing, for example 3D printing, enables forming the fluid conduits inside the casing wall or walls during manufacturing of the casing wall or walls. Further, additive manufacturing enables forming conduit wall or conduits walls for the fluid conduits which are especially advantageous when honeycomb core is provided between the surface layers of the casing wall or walls.

Alternatively, the one or more fluid conduits provided inside the casing wall or walls may be formed by providing one or more boreholes to the casing wall or walls. This enables manufacturing one type of casing wall or walls and modifying them later according to the desired fluid conduit arrangement.

The fluid analyser may further comprise one or more insert pipes arranged inside the one or more fluid conduits provided inside the casing wall or walls. The one or more insert pipes may provide the flow channel for the sample fluid and the sample fluid may flow inside the insert pipes. The insert pipes may also provide flow channel between adjacent casing walls such that sample flow does not escape from the analyser.

The one or more insert pipes may be made of low-reactivity material, polytetrafluoroethylene, or composite comprising polytetrafluoroethylene. This allows the material of analyser casing to be any suitable material. The sample fluid may be reactive or comprise reactive components and thus it is advantageous that the reactions between the sample fluid and the flow channel in which it flows are minimized. Utilizing the insert pipes the amount of low-reactivity material may be decreased and the material of the analyser casing is not restricted to low-reactivity materials.

Alternatively, the one or more insert pipes may be provided with a layer of low-reactivity material, polytetrafluoroethylene, or composite comprising polytetrafluoroethylene on the inner surface of the one or more insert pipes. This allows the amount of low-reactivity material to be further decreased and material of the insert pipes to be chosen freely.

The one or more fluid conduits provided inside the casing wall or walls may be straight linear conduits. This allows the insert pipes to be installed easily into the fluid conduits after manufacturing the casing wall or walls or during the assembly of the analyser casing.

Furthermore, also the one or more insert pipes may be straight linear pipes. Thus, the insert pipes may have predetermined shape and length according to the casing wall or walls and the fluid conduits.

The analyser casing may be formed of two or more separate casing walls. The separate casing walls may be attached to each other for forming the analyser casing. Accordingly, the analyser casing may be assembled in desired form or shape by choosing different separate casing walls.

In one embodiment, the analyser casing may comprise a first end wall, a second end wall and one or more side walls extending between the first and second end walls. In another embodiment, the analyser casing may comprise a first end wall, a second end wall and three or more side walls extending between the first and second end walls for forming the analyser casing as a polygonal prism. In still another embodiment, the analyser casing may comprise a first end wall, a second end wall and four side walls extending between the first and second end walls for forming the analyser casing as a rectangular prism. This kind of analyser casing construction allows easy modification of the analyser casing by modifying the length of the side walls between the first and second end walls.

The one or more fluid conduits provided inside the casing wall or walls may be arranged aligned in adjacent separate casing walls such that the one fluid conduit provided inside the casing walls extend from one separate casing wall to an adjacent casing wall. Accordingly, the fluid conduit may continue to extend over two or more adjacent separate casing walls.

The one or more fluid conduits comprise fluid conduit ends, first end and a second. The fluid conduit ends, or at least second end of one fluid conduit and a first end of another fluid conduit, in adjacent separate casing walls are arranged aligned such that the one fluid conduit provided inside the casing walls extend from one separate casing wall to an adjacent separate casing wall. Thus, the sample fluid may flow from one separate casing wall to another and also the insert may be installed such that it extends from one fluid conduit to another fluid conduit in adjacent separate casing walls.

In one embodiment, the analyser casing may comprise a connector piece provided between the one or more fluid conduits of the adjacent separate casing walls for connecting the one or more fluid conduits of the adjacent separate casing walls. The connector piece may guide the sample fluid from the fluid conduit of one separate casing wall to the fluid conduit of an adjacent separate casing wall and thus connect the fluid conduits of the adjacent separate casing walls.

At least one of the one or more insert pipes may be arranged extend inside the one or more fluid conduits between the fluid conduit ends of the one or more fluid conduits in one separate casing wall. Thus, the insert pipe may extend from the first end and to the second end, or only partly between the first end and the second end.

Further, at least one of the one or more insert pipes may extend inside the one or more fluid conduits between adjacent separate casing walls. Accordingly, the insert pipe may extend from a fluid conduit in one separate casing wall to another fluid in adjacent separate casing wall. Thus, the boundary or seam between the adjacent separate casing walls and between the adjacent fluid conduits, respectively, may be sealed such that leakage or escaping of the sample fluid may be prevented.

The fluid inlet arrangement may comprise an inlet opening provided to the casing wall or walls. The inlet opening is connected to at least one of the one or more fluid conduits provided inside the casing wall or walls. Accordingly, the sample fluid may be supplied from the inlet opening directly into the fluid conduits inside the casing walls.

In one embodiment, the inlet opening may be provided to the first end wall of the analyser casing. The inlet opening may be connected to at least one of the one or more fluid conduits inside the casing wall or walls. Providing the inlet opening to the first end wall of the analyser casing enables simple structure in which the fluid conduits may extend from the first end wall toward the second end wall.

The fluid analyser may comprise one or more sensor parts connected to outer surface of the casing wall or walls of the analyser casing, and to the one or more fluid conduits provided inside the casing wall or walls for providing sample fluid into the one or more sensor parts. This allows supplying the sample fluid directly from the fluid conduits into the sensors parts.

Alternatively, the fluid analyser may comprise one or more sensor parts connected to one or more side walls of the analyser casing or to outer surface of the one or more side walls the analyser casing, and to the one or more fluid conduits provided inside the casing wall or walls for providing sample fluid into the one or more sensor parts. Arranging the sensor parts to the side wall enables modular construction of the side walls and also utilizing the end walls for the inlet opening.

The casing wall or walls or a separate casing wall may comprises a first fluid conduit provided inside the casing wall or walls and a sensor inlet provided to the casing wall or walls or a separate casing wall and connected to the first fluid conduit for conduction fluid sample to the sensor part, and a second fluid conduit provided inside the casing wall or walls and a sensor outlet provided to the casing wall or walls or a separate casing wall and connected to the second fluid conduit for conduction fluid sample from the sensor part. This allows conducting the sample fluid inside the casing wall to the sensor part and return the sample fluid back inside the casing wall from the sensor part.

The casing wall or walls or a separate casing wall may comprise a first fluid conduit provided inside the casing wall or walls and a sensor inlet provided to the casing wall or walls or a separate casing wall. The first fluid conduit is connected to the inlet opening and to the sensor inlet. This enables conducting the sample fluid inside the casing wall to the sensor part collecting or capturing the sample fluid in the sensor part.

The casing wall or walls or a separate casing wall may comprise a second fluid conduit provided inside the casing wall or walls, a sensor outlet provided to the casing wall or walls or a separate casing wall, and an outlet opening for discharging the fluid sample from the analyser. The second fluid conduit is connected to the to the outlet opening and to the sensor outlet. This enables discharging the sample fluid from the analyser or discharging the sample fluid inside the analyser.

According to the above mentioned, the first fluid conduit may extend inside the casing wall to the sensor inlet or sensor inlet opening provided to the surface of the casing wall. The sensor inlet may extend from the surface, inner surface or outer surface, of the casing wall to the first fluid conduit inside the casing wall. Thus, the sample fluid is conducted to the sensor part inside the casing wall or wall structure.

Further, the second fluid conduit may extend inside the casing wall to the sensor outlet or sensor outlet opening provided to the surface of the casing wall. The sensor outlet may extend from the surface, inner surface or outer surface, of the casing wall to the second fluid conduit inside the casing wall. Thus, the sample fluid is conducted from the sensor part inside the casing wall or wall structure.

Based on the above mentioned, the sample fluid maybe conducted to the sensor part inside the casing wall or wall structure and discharged from the sensor part inside the casing wall or wall structure.

Further, the second fluid conduit extending from the sensor outlet may extend further to the sensor inlet of another sensor part. Thus, the second fluid conduit for also the first fluid conduit for the other sensor part or it may be connected to the first fluid conduit of the other sensor part.

In some embodiment, the first fluid conduit may extend between the inlet opening of the inlet arrangement and the sensor inlet such that the sample fluid is conducted from the inlet opening to the sensor inlet inside the casing wall or wall structure.

In one embodiment, the analyser casing may comprise the first end wall, the second end wall and two or more side walls. At least one of the first end wall and the second end wall may comprise one or more transport fluid conduits provided inside the casing wall or walls and extending between the different side walls of the analyser casing. Accordingly, first and/or second end wall may be utilized for turning the flow direction of the sample fluid and conducting the sample fluid from the side wall to another side wall.

In another embodiment, the analyser casing may comprise the first end wall, the second end wall and two or more side walls. At least one of the first end wall and the second end wall may comprise one or more transport fluid conduits provided inside the casing wall or walls and extending between adjacent side walls of the analyser casing. Accordingly, first and/or second end wall may be utilized for turning the flow direction of the sample fluid and conducting the sample fluid from the side wall to an adjacent side wall.

In further embodiment, the analyser casing may comprise the first end wall, a second end wall and three or more side walls. The first and second end walls may have a geometric central area or geometric centre point. At least one of the first end wall and the second end wall may comprise one or more transport fluid conduits provided inside the casing wall or walls and extending between different side walls of the analyser casing without extending via the geometric central area or geometric centre point. This allows the geometric central area of the end wall to be utilized for attaching other components of the analyser to the analyser casing.

In one specific embodiment, the analyser casing may be formed as rectangular prism and may comprise the first end wall, the second end wall and the four side walls extending between the first and second end walls. At least one of the first end wall and the second end wall may comprise one or more transport fluid conduits provided inside the casing wall or walls and extending between adjacent side walls of the analyser casing. Thus, the sample fluid may be conducted successively along the adjacent side walls of the analyser casing.

The present invention further relates to method for analysing fluid in a fluid analyser. The method comprises supplying a fluid sample into the fluid analyser having an analyser casing via a fluid inlet arrangement for supplying the fluid sample into the analyser casing, conducting the fluid sample from the inlet arrangement to one or more fluid sensor parts, and measuring the fluid sample with the one or more fluid sensors provided to the one or more fluid sensor parts. The method of the present invention further comprises conducting the fluid sample between the inlet arrangement and at least one of the one or more sensor parts connected to the casing wall or walls of the analyser casing inside casing wall or walls of the analyser casing along one or more fluid conduits provided inside the casing wall or walls.

The present invention also provides use of one or more fluid conduits provided inside the casing wall or walls of an analyser casing of a fluid analyser for conducting fluid sample in the analyser to at least one fluid sensor.

An advantage of the invention is that providing the fluid conduits inside the casing wall or walls enables simple modular structure for the analyser as the fluid conduits are modified together with modifying the analyser casing. Further, the fluid conduits inside the casing wall or walls saves space inside the casing as no separate fluid tubes are needed. This also enables decreasing weight of the analyser as the separate fluid tubes may be omitted.

BRIEF DESCRIPTION OF THE DRAWINGS

The invention is described in detail by means of specific embodiments with reference to the enclosed drawings, in which

FIGS. 7A, 7B and 7C show schematically cross-sectional views of the separate side wall of FIG. 6.

DETAILED DESCRIPTION OF THE INVENTION

Figure 1:
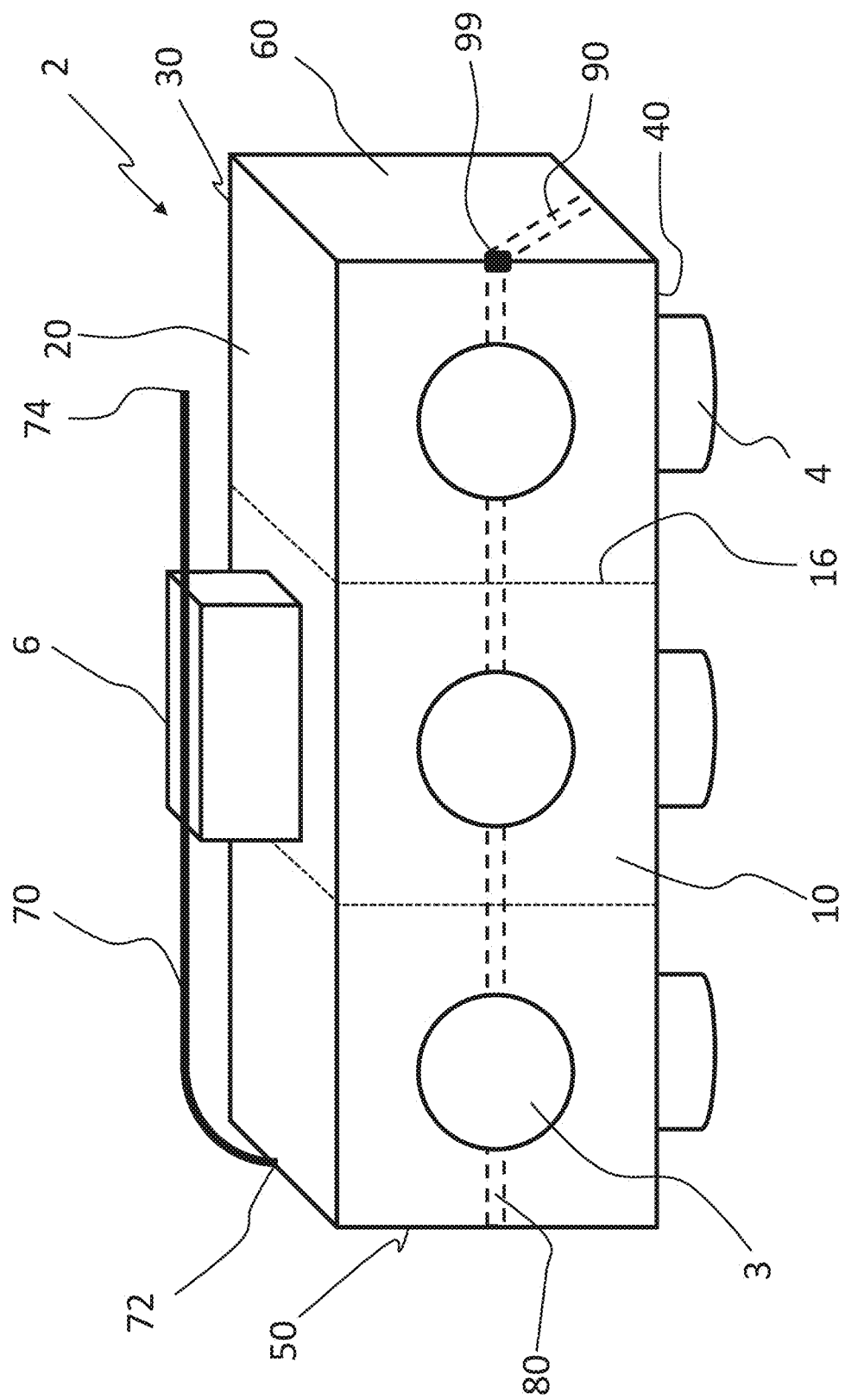
FIG. 1 shows a schematic view of a fluid analyser according to one embodiment of the invention.

FIG. 1 shows schematically one embodiment of a fluid analyser according to the present invention. The fluid analyser comprises an analyser casing 2. Analyser components such as power source, electrical components, pumps, data storage components, wireless transmitters or components for manipulating or processing sample fluid or components for carrying out analysis are arranged inside the analyser casing 2.

It should be noted that the fluid analyser may comprises an inner casing and outer casing enclosing the inner casing, and according to the present invention the analyser casing 2 may be the inner casing or the outer casing of the fluid analyser.

Further, the fluid analyser is preferably a gas analyser or aerosol analyser. However, the fluid analyser may also be liquid analyser or a suspension analyser.

The analyser casing 2 made be manufactures from plastic material, composite material, metal, such as aluminium, or a mixture thereof. The present invention is not limited to any particular material of the analyser casing 2.

The analyser casing 2 is formed by casing walls 10, 20, 30, 40, 50, 60. In the embodiment of the FIGS. 1 to 7, the analyser casing 2 comprises a first end wall 50, and a second end wall 60 and four side walls 10, 20, 30, 40 extending between the first and second end walls 50, 60. The first and second end wall 50, 60 have rectangular or square shape and therefore the analyser casing 2 has a shape of a rectangular prism, as shown in FIG. 1. The analyser casing 2 of FIG. 1 comprises a top side wall 20, a bottom side wall 40 and two opposite lateral side walls 10, 30. The casing walls 10, 20, 30, 40, 50, 60 define an inner casing space in which the analyser components may be arranged.

Figure 2:
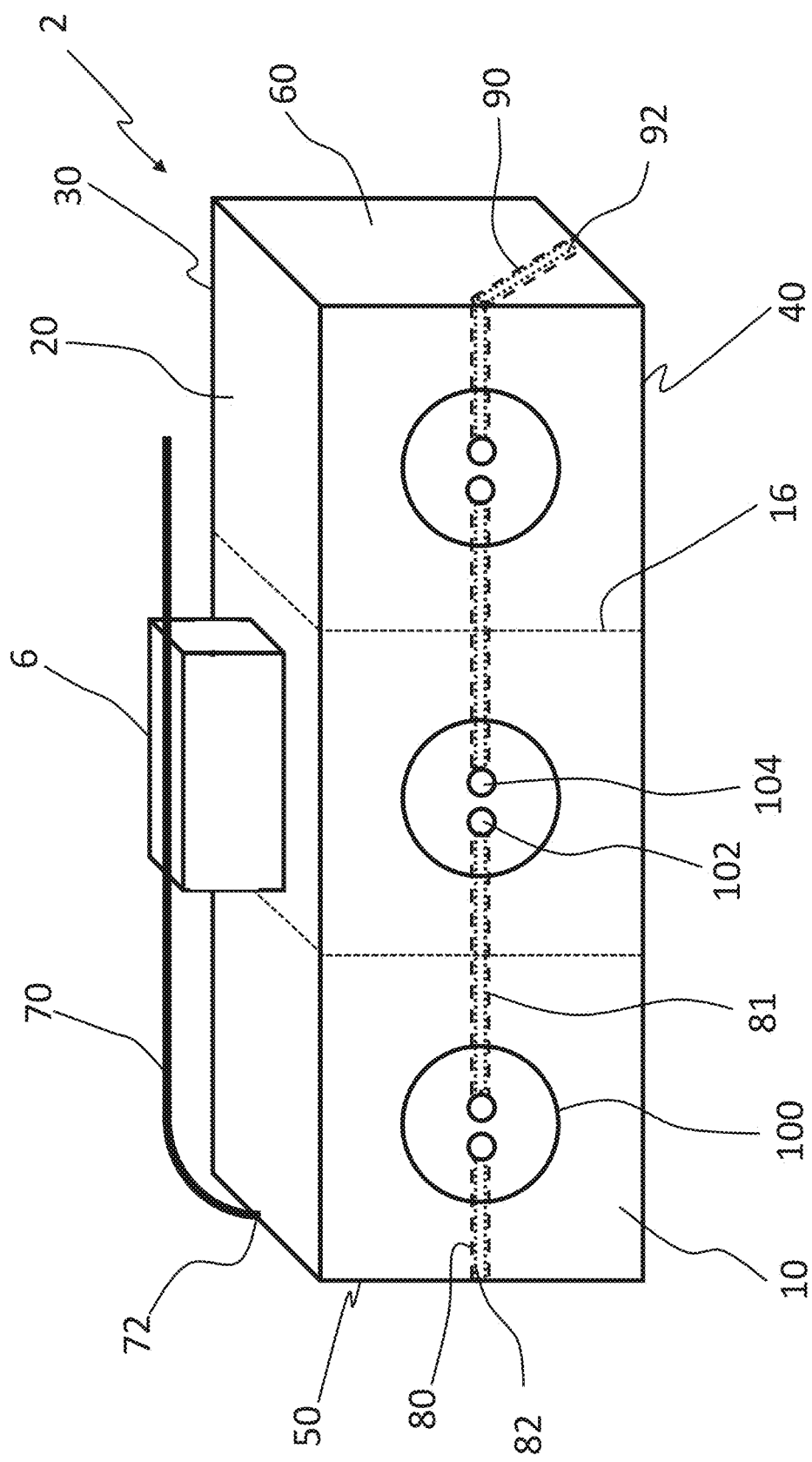
FIG. 2 shows another schematic view of a fluid analyser according to one embodiment of the invention.
Figure 3:
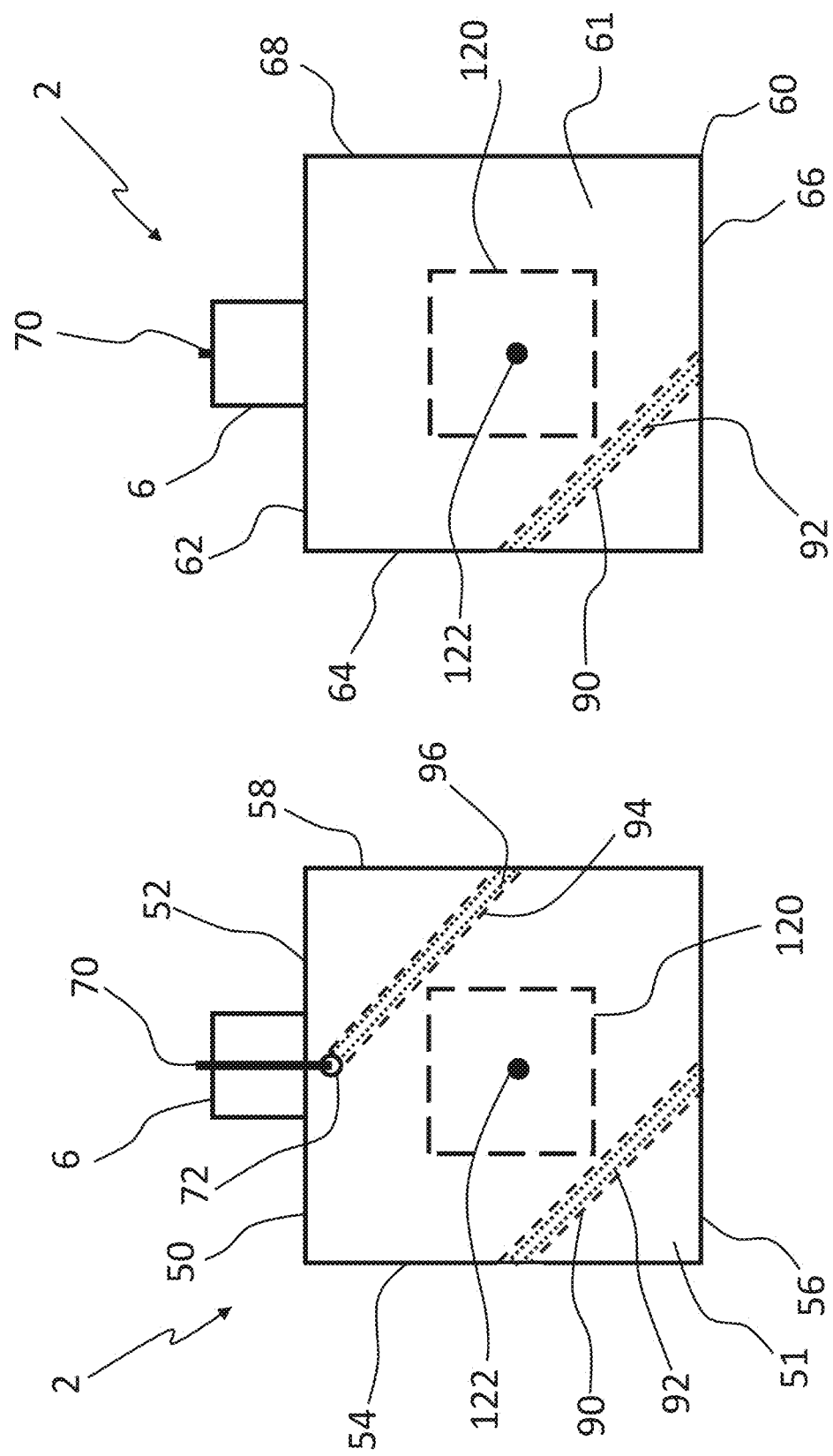
FIGS. 3A and 3B show schematically first and second end walls of the analyser casing.

In the embodiment of FIGS. 1 and 2 the side walls 10, 20, 30, 40 have length which is larger than the dimensions of the square first and second end walls 50, 60 such that the analyser casing 2 is formed longitudinal is shape. In an alternative embodiment, the analyser casing 2 may also have cubic shape in which case the dimensions of the first and second end walls 50, 60 and the side walls 10, 20, 30, 40 are substantially similar.

The analyser casing 2 may be formed such that the casing walls 10, 20, 30, 40, 50, 60 are secured to each other permanently or detachably. Alternatively, two or more of the casing walls 10, 20, 30, 40, 50, 60 may be formed from one piece by manufacturing or shaping or bending the casing wall material. The casing walls 10, 20, 30, 40, 50, 60 may be secured or attached to each other detachably for example with attachment means, such as screws, tenons, pins, corner brackets, or the like or any other mechanical fasteners.

Each casing wall 10, 20, 30, 40, 50, 60 may be formed as one piece structure, as shown in FIG. 1. In this case, the analyser casing 2 may have pre-determined shape and structure. However, in an alternative embodiment, the analyser casing 2 may be formed as modular structure in which separate casing walls 10, 20, 30, 40, 50, 60 may be connected and attached together in desired manner for forming the analyser casing 2.

One modular structure is shown in FIG. 1. In this modular structure each side wall or at least one side wall 10, 20, 30, 40 are formed by separate side walls or separate side wall elements which as attached to each other along the dotted connection lines 16. The separate side wall elements of the side walls 10, 20, 30, 40 may be attached to each other with mechanical fasteners (not shown), such as tenons, pins, screws, or the like.

It should be noted that any or all of the casing walls 10, 20, 30, 40, 50, 60 may comprise one or more separate side wall elements for forming the analyser casing 2 in desired structure and shape.

In the embodiment of FIG. 1, the separate wall elements of the analyser casing 2 have the similar or same me dimensions and/or shape as the first and second end walls 50, 60, for example square or rectangular shape. In other words, the side walls 10, 20, 30, 40 are formed from separate side wall elements having similar or same shape and dimensions as the first and second end walls 50, 60. Accordingly, the shape or the length of the analyser casing 2 between the first and second end walls 50, 60 may be modified by the number of the separate side wall elements used in the side walls 10, 20, 30, 40. In FIG. 1, there are three separate side wall elements in each side wall 10, 20, 30, 40.

It should be noted, that the present invention is not limited to any particular shape of the analyser casing 2. Therefore, analyser casing 2 may also have only one casing wall and curved three-dimensional shape such a ball or ellipsoid. Alternatively, the analyser casing 2 may comprise the first end wall 50, the second end wall 60 and two or more side walls 10, 20, 30, 40 extending between the first and second end walls 50, 60. Further, alternatively the analyser casing 2 may comprise the first end wall 50, a second end wall 60 and three or more side walls 10, 20, 30, 40 extending between the first and second end walls 50, 60 for forming the analyser casing 2 as a polygonal prism. For example, the first and second end walls 50, 60 may have triangular or polygonal shape and the number of side walls 10, 20, 30, 40 corresponds the number corners in the triangular or polygonal shape of the first and second end walls 50, 60 such that the analyser casing 2 has a triangular prism or polygonal prism shape.

The fluid analyser further comprises a fluid inlet arrangement 70, 72, 74 for supplying sample fluid into the fluid analyser. The sample fluid is measured or analyser in the fluid analyser. The fluid inlet arrangement comprises a sampling tube 70 having a sampling opening 74 for receiving the sample fluid into the fluid inlet arrangement and the sampling tube 70. The sampling tube 70 may be any known type of sampling tube and the dimensions and materials of the sampling tube 70 and also the sampling opening 74 may vary depending on the embodiment and type of fluid to be analysed.

The sampling tube 70 may be supported to the analyser casing 2 with casing support 6, as shown in FIG. 1. The casing support 6 may be any kind of rigid support. The casing support 6 may also be used for supporting the fluid analyser or the analyser casing 2 to an external structure such as a mast, building, vehicle or drone. Further, a handle (not shown) may be attached to the casing support 6 for carrying the fluid analyser. In one embodiment, the casing support 6 may be camera support used in cameras for attaching the camera to a camera stand or to a drone.

The sampling tube 70 is further connected to an inlet opening 72 for supplying the sample fluid into the fluid analyser or the analyser casing 2, as shown in FIG. 3A.

The fluid analyser further comprises one or more sensors for measuring the sample fluid in the fluid analyser. The sensors may be any known sensors, such as gas sensors, particle sensors, liquid sensors, particle sensors or any other known sensors capable of measuring fluid properties. For example, there may be two or more different sensors for measuring different properties, concentrations, constituents and compositions of fluids or substances in the fluids, or physical properties of the fluids. Two or more different gas sensors may be used for analysing different properties or substances in the sample fluid.

As shown in FIG. 1, the fluid analyser comprises sensors parts 3, 4 connected to the outer surfaces of the analyser walls 10, 20, 30, 40, 50, 60, and especially to the side walls 10, 20, 30, 40. The sensor parts 3, 4 comprise the sensors for measuring the properties of the sample fluid. Therefore, the sample fluid is conducted from the fluid inlet arrangement 70, 72, 74, or the inlet opening 72 of the fluid analyser to the sensor parts 3, 4 in which the sample fluid is measured.

The fluid analyser may thus comprise one or more sensor parts 3, 4. In the embodiment of FIG. 1, the sensor parts 3, 4 are connected to the outer surfaces of the side walls 10, 20, 30, 40. However, the sensor parts 3, 4 may also be provided instead of or in addition to the side walls 10, 20, 30, 40 to the first and/or second end wall 50, 60 of the analyser casing 2.

The sensor parts 3, 4 are attached to the casing walls 10, 20, 30, 40, 50, 60 with sensor part connections. The sensor part connections may be surface connections with which sensor parts 3, 4 may be attached to the outer surface of the casing walls 10, 20, 30, 40, 50, 60. The sensor part connection may comprise one or more mechanical connections for attaching the sensor part 3, 4 to the analyser casing 2, one or more fluid connections for conducting sample fluid into the sensors part 3, 4 from the analyser casing 2 and/or from the sensor part 3, 4 to the analyser casing 2, and optionally also an electrical connection for providing electricity to the sensor part 3, 4 or the sensor or sensor components in the sensor parts 3, 4.

However, it should be noted that the present invention is not limited to the embodiments in which the sensor parts 3, 4 are arranged or attached to the outer surface of the casing walls 10, 20, 30, 40, 50, 60, but the sensor parts 3, 4 may also be arranged or attached to the inner surface of the casing walls 10, 20, 30, 40, 50, 60, or in some other way inside the analyser casing. Further, the sensor parts 3, 4 may also be arrange to the fluid analyser in any alternative manner.

The sample fluid is conducted from the inlet arrangement 70, 72, 74 into the sensors parts 3, 4 in the analyser casing 2. The sample fluid may also be returned to the analyser casing 2 from each or one or more of the sensor parts 3, 4.

The sensor parts 3, 4 may be arranged in series to the fluid analyser such that the sample fluid is conducted successively through or via each of the sensor parts 3, 4, as shown in FIG. 1. Thus, the sample may be conducted from the inlet opening 72 successively to the sensor parts 3, 4 of the fluid analyser. Alternatively, the sensor parts 3, 4 may be arranged parallel to the fluid analyser such that the sample fluid divided into two or more sub-sample fluids each of which are conducted separately to different sensor parts 3, 4. Yet alternatively, the sensor parts 3, 4 may be arranged to the fluid analyser both parallel and in series such that the may be two or more sensors parts 3, 4 in parallel and two or more sensor parts in series, similarly as mentioned above.

The sample fluid is conducted form the inlet arrangement 70, 72, 74 or the inlet opening 72 to the sensor parts 3, 4 or sensors via fluid conduits 80, 90. According to the present invention at least part of one or more fluid conduits 80, 90 are provided inside the casing wall or walls 10, 20, 30, 40, 50, 60, as shown with dotted lines in FIG. 1.

Inside the casing wall or walls 10, 20, 30, 40, 50, 60 means that one or more fluid conduits extend inside the casing wall or walls 10, 20, 30, 40, 50, 60 and between the first and second wall surface, or the inner and outer wall surface, of the casing wall or walls 10, 20, 30, 40, 50, 60. Therefore, the casing wall or walls 10, 20, 30, 40, 50, 60 comprise the first wall surface 9 and a second wall surface 11, and that the one or more fluid conduits 80, 90 are provided between the first and second wall surfaces 9, 11, as shown in FIGS. 7A, 7B and 7C.

Further, it should be noted that in the present invention all the fluid conduits 80, 90 may be arranged inside the casing wall or walls 10, 20, 30, 40, 50, 60. Alternatively, only part of the one or more fluid conduits 80, 90 may be arranged inside the casing wall or walls 10, 20, 30, 40, 50, 60 or the fluid conduits 80, 90 may extend only part of their distance inside the casing wall or walls 10, 20, 30, 40, 50, 60. Accordingly, the sample fluid may be conducted in the fluid conduits 80, 90 inside the casing wall or walls 10, 20, 30, 40, 50, 60 from the inlet opening 72 to the sensor parts 3, 4, or the sample flow may be conducted only part of the distance from the inlet opening 72 to the sensor parts 3, 4 inside the casing wall or walls 10, 20, 30, 40, 50, 60.

It should be noted that in the context of this application the wording inside the casing wall or walls means that fluid conduits are provided inside the wall structure, or between the opposite surface or the first and second surface, of the casing wall or wall structure. The mentioned wording does not mean the inner casing space defined by the casing walls.

In FIG. 2 is shown the analyser of FIG. 1 such that the sensor parts 3, 4 are removed from the analyser casing 2. The casing wall or walls 10, 20, 30, 40, 50, 60, or the casing side walls 10, 20, 30, 40 may comprise sensor part connection arrangements 100 for connecting the sensor parts 3, 4 to the casing wall or walls 10, 20, 30, 40, 50, 60. The sensor part connection arrangement 100 comprises sensor inlet 102 for supplying sample fluid from a first fluid conduit 80 to the sensor part 3, 4 and a sensor outlet 104 for conducting the sample fluid from the sensor part 3, 4 to a second fluid conduit 81. Thus, the supplied from inside the casing wall or walls 10, 20, 30, 40, 50, 60 to the sensor part 3, 4 and returned from the sensor part 3, 4 to inside the casing wall or walls 10, 20, 30, 40, 50, 60. The first fluid conduit 80 is connected to the sensor inlet 102 and the second fluid conduit is connected to the sensor outlet 104.

As shown in FIG. 2, the fluid conduits 80, 81 and 90 are provided with insert pipes 82, 92 which are arranged inside the fluid conduits 80, 90 provided inside the casing wall or walls 10, 20, 30, 40, 50, 60. The sample fluid is arranged to flow inside the insert pipes 82, 92.

The insert pipes may extend along the whole length of the fluid conduits 80, 90. Alternatively, the insert pipe 82, 92 may extend only along part of the length of the fluid conduit 80, 90.

The insert pipes 82, 92 are preferably made of low-reactivity material, such as polytetrafluoroethylene, or composite comprising polytetrafluoroethylene, or some other inert or low-reactivity material. Alternatively, the insert pipes 82, 92 may be provided with a layer of low-reactivity material, such as polytetrafluoroethylene, or composite comprising polytetrafluoroethylene on the inner surface of the one or more insert pipes 82, 92.

The fluid conduits 80, 90 inside the casing wall or walls 10, 20, 30, 40, 50, 60 are preferably straight linear conduits 80, 90, without bends or turns. The bends or turns in the fluid conduits are formed by connecting or combining straight linear fluid conduits, as shown in FIG. 2 by fluid conduits 80 and 90. Accordingly, the insert pipes 82, 92 may also be straight linear pipes. Thus, one insert pipe 82, 92 may extend only in one fluid conduit 80, 90, and not over any bends or turns. The insert pipes 82, 92 may be stringed or placed inside the fluid conduits 80, 90 by pushing as they are straight linear.

However, in some embodiment the fluid conduits 80, 90 inside the casing wall or walls 10, 20, 30, 40, 50, 60 may also be curved in one or more directions. In this case, the insert pipes 82, 92 could be heated before installing them into the fluid conduits 80, 90 for providing increased flexibility or bendability to the insert pipes 82, 92.

FIG. 3A shows the first end wall 50 of the analyser casing 2. The first end wall 50 comprises the inlet opening 72 for supplying the sample fluid into the analyser. The inlet opening 72 is provided on the outer surface 51, or first surface 51, of the first end wall 50 and it is open or connected to the fluid conduit 94, or inlet fluid conduit 94 having insert pipe 96. The first end wall 50 comprises a top edge 52, a bottom edge 56 and first side edge 58 and second side edge 54. The top edge 52 connects to the top side wall 20, the bottom edge 56 connects to the bottom side wall 40 and first and second side edges 58, 54 connect to the two opposite lateral side walls 10, 30. The inlet fluid conduit 94 extends from the inlet opening 72 to the first side edge 58 and connects to the fluid conduit 80 in the first side wall 10, and thus the sample fluid is conducted from the first end wall to the first side wall 10.

FIG. 3B shows the second end wall 60 of the analyser casing 2. The second end wall 60 comprises an outer surface 61 a top edge 62, a bottom edge 66 and first side edge 68 and second side edge 64. The top edge 62 connects to the top side wall 20, the bottom edge 66 connects to the bottom side wall 40 and first and second side edges 68, 64 connect to the two opposite lateral side walls 10, 30. The inlet fluid conduit 94 extends from the inlet opening 72 to the first side edge 58 and connects to the fluid conduit 80 in the first side wall 10, and thus the sample fluid is conducted from the first end wall to the first side wall 10. The second end wall 60 comprises a transport fluid conduit 90, having the insert pipe 92. The transport fluid conduit 90 is provided inside the second end wall 60 and extend between the second edge 64 and the bottom edge 66 of the second end wall 60, and further from the first side wall 10 to the bottom wall 40 of the analyser casing 2. Accordingly, the sample fluid flow may be turned from the first side wall 10 to the bottom wall 40.

As shown in FIG. 3A, the first end wall 50 also comprises the transport fluid conduit 90, having the insert pipe 92. The transport fluid conduit 90 is provided inside the second end wall 60 and extend between the bottom edge 56 and the second side edge 54 of the first end wall 50, and further from the bottom wall 40 to the second wall 30 of the analyser casing 2. Accordingly, the sample fluid flow may be turned from the bottom wall 40 to the second side wall 30.

Accordingly, the sample fluid flow may be conducted successively along the fluid conduits 80, 90 via all or some the side walls 10, 20, 30, 40 of the analyser casing 2, by turning the sample fluid flow at the end walls 50, 60 of the analyser casing 2.

As shown in FIGS. 3A and 3B, the first and second end walls 50, 60 comprise a geometric central area 120 or geometric centre point 122. The transport fluid conduits 90 are provided inside the first and second end walls 50, 60 such that they extend between different side walls 10, 20, 30, 40 of the analyser casing 2 or between different, or adjacent edges of the first and second side walls 50, 60 without extending via the geometric central area 120 or geometric centre point 122 or extending around or past the geometric central area 120 or geometric centre point 122. This allows utilizing the first and second side walls 50, 60 or the geometric central area 120 or geometric centre point 122 of the them for attaching analyser components to the analyser casing 2. Shape of the central area 120 substantially corresponds the shape of the end wall 50, 60. This means that, when the end wall 50, 60 has square shape of the central area 120 has a square shape. The size of the central area 120 is between 10% to 80% of the surface of the end wall 50, 60, preferably between 20% to 70%, and more preferably between 30% to 50%.

Figure 4:
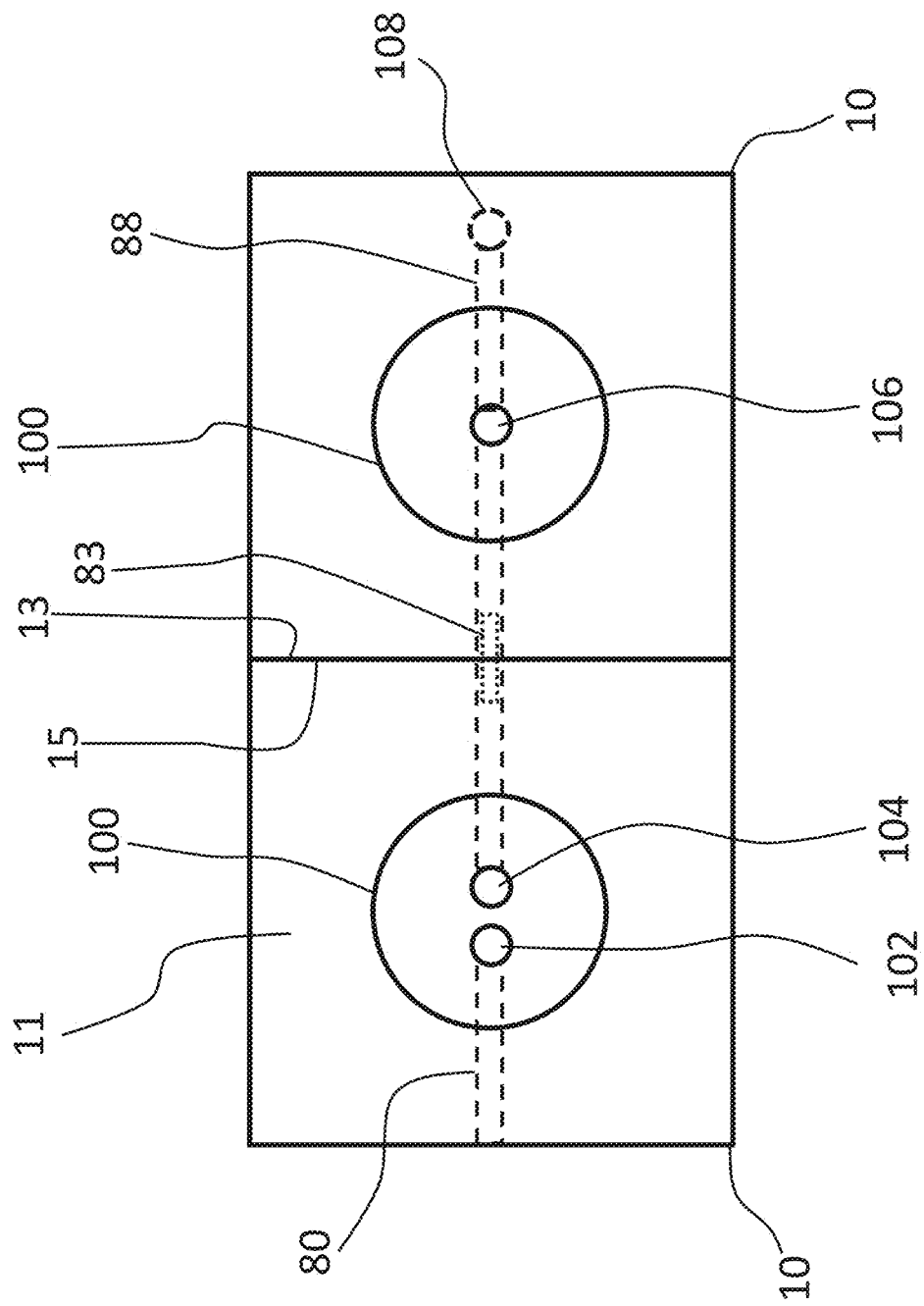
FIG. 4 shows schematically two separate side walls of the analyser casing.

FIG. 4 shows schematically, two separate side wall elements 11 attached to each other along their opposite edges 13, 15. The fluid conduits 80 provided inside the adjacent separate casing elements 11 are arranged aligned in such that the one fluid conduit provided inside the casing walls extend from one separate casing wall element 11 to an adjacent separate casing wall element 11. This same applies to all casing walls and separate casing walls 10, 20, 30, 40, 50, 60 such that the fluid conduits 80, 90 are aligned, or their ends are aligned, such that the fluid conduit continues from one casing wall or separate casing walls 10, 20, 30, 40, 50, 60 to another.

FIG. 4 further shows, an insert pipe 83 provided between the adjacent casing wall elements 11 such that the insert pipe 83 extends from the fluid conduit 80 of the one casing wall element 11 to the fluid conduit 80 of the adjacent casing wall element 11 for sealing the seam between the opposite edges 13, 15 of the adjacent casing wall elements 11. This same may be utilized also in all connections between adjacent casing walls and separate casing walls 10, 20, 30, 40, 50, 60.

In FIG. 4, the casing wall element 11 on right comprises a first fluid conduit 80 provided inside the casing wall element 11 and the sensor fluid connection 106 provided to the casing wall element 11 at the sensor part connection 100. There is also an outlet fluid conduit 88 provided inside the casing wall element 11 and connected to an outlet opening 108. It should be noted that the outlet opening may be provided to any casing wall 10, 20, 30, 40, 50, 60. In the FIG. 4, the outlet opening 108 is open inside the analyser casing 2, provided on the inner surface of the casing wall 10, 20, 30, 40, 50, 60 such that sample fluid is discharged inside the analyser casing 2. Alternatively, the outlet opening 108 may be open to outer surface of the casing wall 10, 20, 30, 40, 50, 60. Discharging the sample fluid inside the analyser casing 2 allows providing over pressure inside the analyser casing 2.

Figure 5:
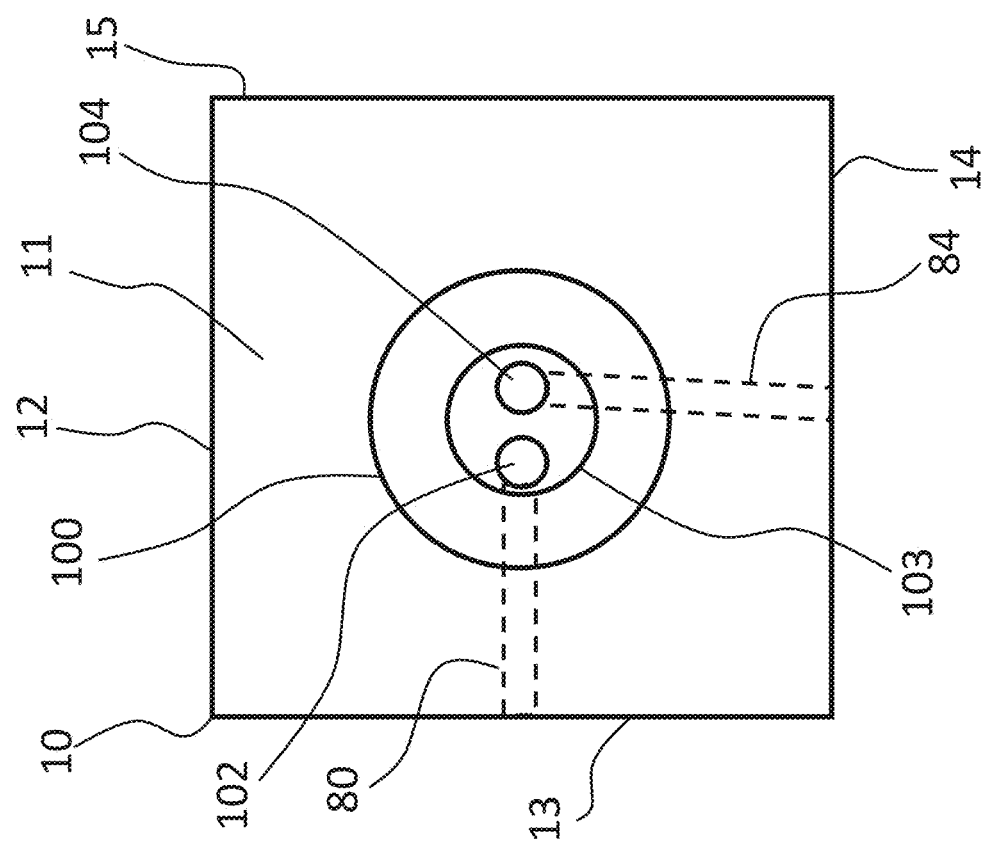
FIG. 5 shows schematically a separate side wall of the analyser casing.

FIG. 5 shows an embodiment, in which the separate side wall 10 or the wall element 11 comprises a top edge 12, a bottom edge 14 and first side edge 15 and second side edge 13. The top edge 12 connects to the top side wall 20 and the bottom edge 14 connects to the bottom side wall 40. The sensor part connection 100 comprises a fluid connection 103 having the sensor inlet 102 and the sensor outlet 104. In this embodiment, the separate side wall 10 or the wall element 11 comprises a first fluid conduit 80 extending form the second side edge 13 to the sensor inlet 102 and a transport conduit 84 extending from the sensor outlet 104 to the bottom edge 14. Thus, the transport conduit 84 enables conducting the sample fluid to the bottom wall 30 of the analyser casing 2 from the side wall 10, and from the second side edge 13 to the bottom edge 14, via the sensor part 3, 4.

Accordingly, the first fluid conduit 80 and the transport conduit 84 may extend from the fluid connection to different or adjacent sides wall of the casing for turning the flow direction of the sample fluid. Generally, the first fluid conduit may extend from one wall edge 12, 13, 14, 15 or side wall 10, 20, 30, 40 of the casing 2 to different, or adjacent or opposite wall edge 12, 13, 14, 15 or side wall 10, 20, 30, 40 of the casing 2.

Further, it should be noted that the sensor part connection 100 or the fluid connection 103 may also comprise only one sensor opening, and it may function as sensor inlet and/or sensor outlet, as shown in FIG. 4.

Figure 6:
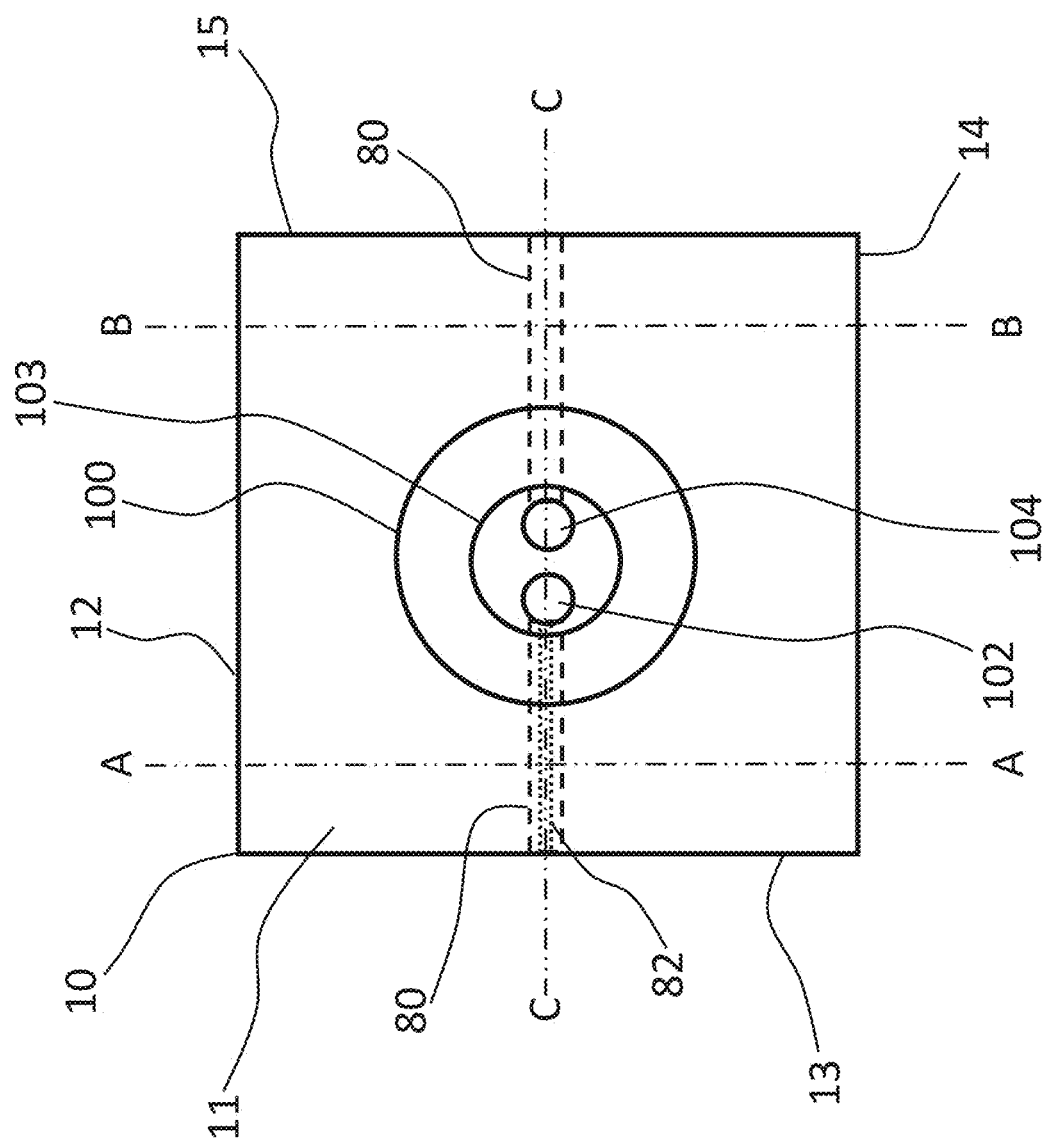
FIG. 6 shows schematically a separate side wall of the analyser casing.

FIG. 6 shows schematically the casing side wall 10 or the separate casing side wall 10 of the casing side wall element 11 of FIGS. 1 and 2 with cross-sections A-A, B-B and C-C. FIGS. 7A, 7B and 7C show the cross sections A-A, B-B and C-C respectively.

The side wall 10, comprises the first wall surface 9, inner wall surface, and a second surface layer forming the second wall surface 11, outer wall surface. The side wall 10 may be formed as solid wall from one material or mixture of material. In FIGS. 7A, 7B and 7C, the side wall 10 comprise a first surface layer forming the first wall surface 9 and a second surface layer forming the second wall surface 11. The side wall 10 further comprises a core 110, 112 between the surface layers 9, 11.

In the embodiment of FIG. 7A, cross section along A-A in FIG. 6, the core 110 is formed of foam material provided between the first and second surface layers 9, 11. The fluid conduit 80 is formed to the foam core 110 and the insert pipe 82 is arranged inside the fluid conduit 80.

FIG. 7B shows cross section along B-B in FIG. 6, and an alternative embodiment, in which the core 112 is formed as a honeycomb structure or a cellular structure, or as a net-structure between the first and second surface layers 8, 11. The cellular structure or the honeycomb structure may have any symmetric or repetitive geometrical shape or a non-geometrical shape. The fluid conduit 80 is formed to the cellular, honeycomb or net-like core structure 112.

FIG. 7C shows cross section along C-C in FIG. 6. The fluid conduits 80 are connected to the sensor inlet and outlet 102, 104 and formed to the core 112. The sample inlet and outlet 102, 104 extend form the outer surface 11 to the fluid conduits 80. The fluid conduits 80 have a conduit wall 87 separating the fluid conduits from the honeycomb core structure 112.

All the above mentioned may be applied to all casing walls 10, 20, 30, 40, 50, 60.

The casing walls 10, 20, 30, 40, 50, 60 may be manufacture in any manufacturing method, for example by additive manufacturing, comprising 3D printing. Additive manufacturing is preferable, as the fluid conduits may be manufactured at the same time. Further, the additive manufacturing enables forming honeycomb core 112 and the fluid conduits with the conduit walls 87. Alternatively, the fluid conduits may be formed separately to the casing walls 10, 2, 30, 40, 50, 60, for example by boring or melting. In one embodiment, at least one of the casing wall or walls 10, 20, 30, 40, 50, 60 may be made from two halves, preferably identical halves. Each of the two halves may comprise a wall surface 9, 10, one of the first and second wall surfaces 9, 10, and a longitudinal half of the one or more fluid conduits 80, 84, 90, 94, for forming the one or more fluid conduits 80, 84, 90, 94 inside the casing wall or walls 10, 20, 30, 40, 50, 60.

The invention has been described above with reference to the examples shown in the figures. However, the invention is in no way restricted to the above examples but may vary within the scope of the claims.

The invention claimed is:

1. A fluid analyser, comprising:
    an analyser casing having a casing wall or walls defining an inner casing space;
    one or more sensor parts having a fluid sensor for analysing fluid;
    a fluid inlet arrangement for supplying fluid into the fluid analyser; and
    one or more fluid conduits for conducting fluid between the fluid inlet arrangement and the one or more sensor parts, wherein at least part of the one or more fluid conduits are provided inside a wall structure of the casing wall or walls; and
    one or more insert pipes arranged inside the one or more fluid conduits that are provided inside the wall structure of the casing wall or walls,
    wherein the casing wall or walls comprises separate casing wall elements for forming the analyser casing, and that the one or more fluid conduits provided inside the casing wall or walls extends from one separate casing wall element to an adjacent separate casing wall element,
    wherein the one or more insert pipes are provided between the adjacent separate casing wall elements such that the insert pipe extends from the fluid conduit of the one separate casing wall element to the fluid conduit of the adjacent separate casing wall element for sealing the seam between opposite edges of the adjacent separate casing wall elements,
    wherein the one or more sensor parts is connected to an outer surface of the casing wall or walls of the analyser casing and to the one or more fluid conduits provided inside the casing wall or walls with sensor part connections for providing sample fluid into the at least one sensor part, the sensor part connections comprising:
        one or more mechanical connections for attaching the one or more sensor parts to the analyser casing; and
        one or more fluid connections having a sensor inlet and a sensor outlet for conducting sample fluid into the one or more sensor parts.

2. The fluid analyser according to the claim 1, wherein the wall structure of the casing wall or walls comprise a first wall surface and a second wall surface, and that the one or more fluid conduits are provided between the first and second wall surfaces.

3. The fluid analyser according to the claim 1, wherein at least one of the casing wall or walls:
    are formed as solid wall; or
    comprise a first a surface layer forming the first wall surface and a second surface layer forming the second wall surface, and the at least one of the casing wall or walls comprises a hollow core between the first and second surface layer; or
    comprise a first surface layer forming the first wall surface and a second surface layer forming the second wall surface, and the at least one of the casing wall or walls comprises a cellular structure or net-structure between the first and second surface layers; or
    comprise a first surface layer forming the first wall surface and a second surface layer forming the second wall surface, and the at least one of the casing wall or walls comprises foam material between the first and second surface layer.

4. The fluid analyser according to claim 1, wherein:
at least one of the casing wall or walls is made by additive manufacturing such that the one or more fluid conduits provided inside the casing wall or walls if formed by the additive manufacturing; or
the one or more fluid conduits provided inside the casing wall or walls are formed by providing one or more boreholes to the casing wall or walls; or
at least one of the casing wall or walls is made from two halves, each of the two halves comprising a wall surface and a longitudinal half of the one or more fluid conduits.

5. The fluid analyser according to claim 1, wherein:
the one or more insert pipes are made of low-reactivity material, polytetrafluoroethylene, or composite comprising polytetrafluoroethylene; or
the one or more insert pipes are provided with a layer of low-reactivity material, polytetrafluoroethylene, or composite comprising polytetrafluoroethylene on the inner surface of the one or more insert pipes.

6. The fluid analyser according to claim 1, wherein:
the one or more fluid conduits provided inside the casing wall or walls are straight linear conduits; or
the one or more fluid conduits provided inside the casing wall or walls are straight linear conduits, and that the one or more insert pipes are straight linear pipes.

7. The fluid analyser according to claim 1, wherein the analyser casing is formed of two or more separate casing walls, and that the separate casing walls are attached to each other for forming the analyser casing.

8. The fluid analyser according to claim 1, wherein the analyser casing comprises:
a first end wall, a second end wall and one or more side walls extending between the first and second end walls; or
a first end wall, a second end wall and three or more side walls extending between the first and second end walls for forming the analyser casing as a polygonal prism; or
a first end wall, a second end wall and four side walls extending between the first and second end walls for forming the analyser casing as a rectangular prism.

9. The fluid analyser according to claim 1, wherein:
the one or more fluid conduits provided inside the casing wall or walls are arranged aligned in adjacent separate casing walls such that the one fluid conduit provided inside the casing walls extend from one separate casing wall to an adjacent separate casing wall; or
the one or more fluid conduits comprise fluid conduit ends, and that the fluid conduit ends in adjacent separate casing walls are arranged aligned such that the one fluid conduit provided inside the casing walls extend from one separate casing wall to an adjacent separate casing wall; or
the analyser casing comprises a connector piece provided between the one or more fluid conduits of the adjacent separate casing walls for connecting the one or more fluid conduits of the adjacent separate casing walls.

10. The fluid analyser according to claim 9, wherein:
at least one of the one or more insert pipes extend inside the one or more fluid conduits between the fluid conduit ends of the one or more fluid conduits in one separate casing wall; or
at least one of the one or more insert pipes extend inside the one or more fluid conduits between adjacent separate casing walls.

11. The fluid analyser according to claim 1, wherein the fluid inlet arrangement comprises:
an inlet opening provided to the casing wall or walls, the inlet opening being connected to at least one of the one or more fluid conduits provided inside the casing wall or walls; or
an inlet opening provided to the first end wall of the analyser casing, the inlet opening being connected to at least one of the one or more fluid conduits inside the casing wall or walls.

12. The fluid analyser according to claim 1, wherein:
the one or more sensor parts are connected to an outer surface of the casing wall or walls of the analyser casing, and to the one or more fluid conduits provided inside the casing wall or walls for providing sample fluid into the one or more sensor parts; or
the one or more sensor parts are connected to one or more side walls of the analyser casing or to an outer surface of the one or more side walls the analyser casing, and to the one or more fluid conduits provided inside the casing wall or walls for providing sample fluid into the one or more sensor parts.

13. The fluid analyser according to claim 1, wherein:
the casing wall or walls or a separate casing wall comprises a first fluid conduit provided inside the casing wall or walls and a sensor inlet provided to the casing wall or walls or a separate casing wall and connected to the first fluid conduit for conduction fluid sample to the one or more sensor parts, and a second fluid conduit provided inside the casing wall or walls and a sensor outlet provided to the casing wall or walls or a separate casing wall and connected to the second fluid conduit for conduction fluid sample from the one or more sensor parts; or
the casing wall or walls or a separate casing wall comprises a first fluid conduit provided inside the casing wall or walls and a sensor inlet provided to the casing wall or walls or a separate casing wall, the first fluid conduit being connected to the inlet opening and to the sensor inlet; or
the casing wall or walls or a separate casing wall comprises a second fluid conduit provided inside the casing wall or walls, a sensor outlet provided to the casing wall or walls or a separate casing wall, and an outlet opening for discharging the fluid sample from the analyser, the second fluid conduit being connected to the to the outlet opening and to the sensor outlet.

14. The fluid analyser according to claim 1, wherein:
the analyser casing comprises the first end wall, the second end wall and two or more side walls, and that at least one of the first end wall and the second end wall comprise one or more transport fluid conduits provided inside the casing wall or walls and extending between the different side walls of the analyser casing; or
the analyser casing comprises the first end wall, the second end wall and two or more side walls, and that at least one of the first end wall and the second end wall comprise one or more transport fluid conduits provided inside the casing wall or walls and extending between adjacent side walls of the analyser casing; or
the analyser casing comprises the first end wall, a second end wall and three or more side walls, the first and second end walls having a geometric central area or geometric centre point, and that at least one of the first end wall and the second end wall comprise one or more transport fluid conduits provided inside the casing wall or walls and extending between different side walls of the analyser casing without extending via the geometric central area or geometric centre point; or the analyser casing is formed as rectangular prism and comprises the first end wall, the second end wall and the four side walls extending between the first and second end walls and that at least one of the first end wall and the second end wall comprise one or more transport fluid conduits provided inside the casing wall or walls and extending between adjacent side walls of the analyser casing.

15. The fluid analyser according to claim 1, wherein the one or more fluid connections having a sensor inlet and a sensor outlet for conducting sample fluid from the analyser casing to the one or more sensor parts.

16. The fluid analyser according to claim 1, wherein the one or more fluid connections having a sensor inlet and a sensor outlet for conducting sample fluid from the one or more sensor parts to the analyser casing.

17. The fluid analyser according to claim 1, wherein the one or more fluid connections having a sensor inlet and a sensor outlet for conducting sample fluid from the analyser casing to the one or more sensor parts, and from the one or more sensor parts to the analyser casing.

\* \* \* \* \*